United States Patent [19]

Sudler

[11] 4,206,375
[45] Jun. 3, 1980

[54] SINGLE PHASE STEPPING MOTOR

[75] Inventor: Roland Sudler, Frankfurt, Fed. Rep. of Germany

[73] Assignee: Quarz-Zeit AG, Frankfurt am Main, Fed. Rep. of Germany

[21] Appl. No.: 877,254

[22] Filed: Feb. 13, 1978

[30] Foreign Application Priority Data

Feb. 19, 1977 [DE] Fed. Rep. of Germany ....... 2707252

[51] Int. Cl.² ........................................... H02K 37/00
[52] U.S. Cl. ................................. 310/49 R; 310/163; 310/112
[58] Field of Search ................ 310/49, 162, 165, 156, 310/112

[56] References Cited
U.S. PATENT DOCUMENTS
3,989,967 11/1976 Kikuyama et al. .............. 310/162 X Primary Examiner—Donovan F. Duggan
Attorney, Agent, or Firm—Martin A. Farber

[57] ABSTRACT

A single phase stepping motor, particularly for clocks, with a multi-polar rotor and a multi-part stator, the latter carrying two excitation coils and on its free ends having stator pole teeth which are directed toward the rotor face side as well as a passage opening for the rotor shaft. The stator includes four parts, each of which has the same number of poles with the same distribution, and respectively two are connected with each other on their non-pole ends across one bridge part, the latter carrying one excitation winding. Both of the excitation windings are connected in series.

12 Claims, 3 Drawing Figures

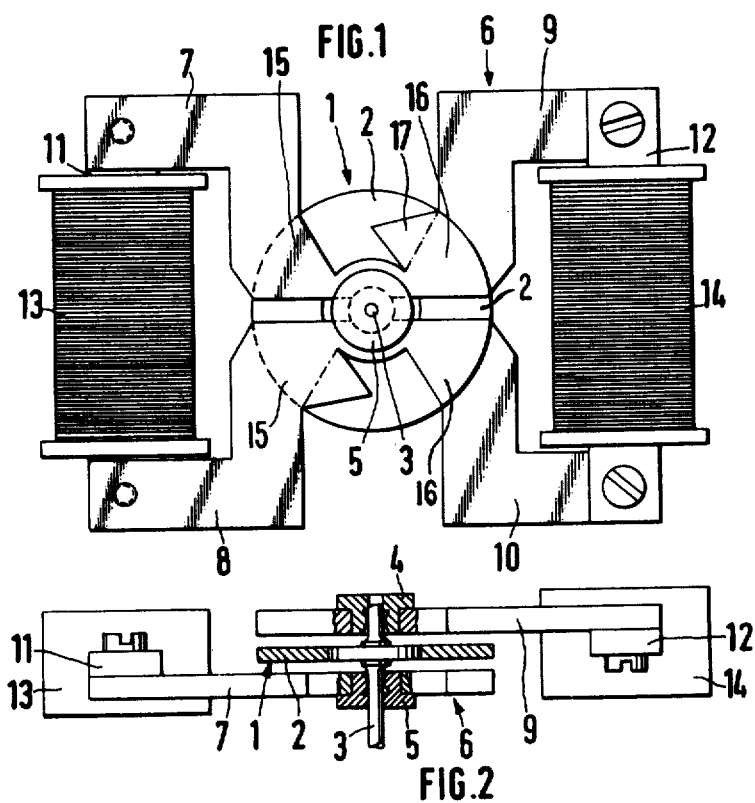

SINGLE PHASE STEPPING MOTOR

The invention relates to a single phase stepping motor, particularly for clocks, with a multi-polar rotor and a multi-part stator, the latter carrying two excitation coils and on its free ends having stator pole teeth which are directed toward the rotor front side as well as a passage opening for the rotor shaft.

Various single phase stepping motors of this species already have been proposed. They generally comprise a rotor having a plurality of pole teeth made of a soft magnetic material (or low retentive material) of low coercive force or retentivity or a permanent magnetic rotor and a stator made of two stator parts connected with one another over a bridge part carrying the excitation coil, of which each stator part changes or passes on its free end into an equal or smaller number (in comparison to the rotor pole number) of stator pole teeth, the stator pole teeth being directed toward the face side of the rotor. Compared to the known motors such type of single phase stepping motors has a lower energy consumption, a higher efficiency and a smaller construction volume. Moreover these motors can be produced simpler than the known motors.

In addition single phase stepping motors are known which comprise a U-shaped yoke with pole shoes arranged on the free ends of the yoke and which carry one excitation coil on respectively each one leg of the yoke, the excitation coils alternately and successively being applied with current pulses. By the subdivision of the excitation coil into two coils which are applied successively and alternately with current, there exists the possibility to be able to feed the motors with pulses of the same polarity. The energy consumption, efficiency and the construction volume of the single phase stepping motors to a considerable extent leaves much to be desired.

It is an object of the invention to further reduce the construction volumes of the introductory described single phase stepping motors.

It is another object of the present invention to aid the solution of the above-mentioned object in the manner that the stator (e.g., 6, 6') contains four parts (e.g., 7, 8, 9, 10; 7', 8', 9', 10'), each of which has the same number of poles (15, 16) with the same distribution, and respectively two of the stator parts are connected with each other on their non-pole ends (the ends without the poles) over one bridge part (11, 12; 11', 12'), the latter carrying one excitation winding (13, 14; 13', 14'), and both of the excitation windings (13, 14; 13', 14') are connected in series.

By the subdivision of the stator into two stator circuits (domains) which are each provided with one excitation winding the following is achieved. The cross-section dimensions of the excitation windings, which respectively are both applied simultaneously with current, can be executed smaller than that of one single excitation winding. The consequence is that the construction height of the motor can be reduced considerably in comparison to that which has already been proposed. A particular advantage of the invention resides in that the production costs are increased only to an extremely small extent since the individual parts of the stator are congruent and identical and consequently can be produced in a single die cutting, stamping or punching cut.

According to one embodiment of the invention the stator parts (7, 8) which are associated with one excitation winding (13) at least in the range or vicinity of the rotor (1) are arranged in one first plane and the stator parts (9, 10) which are associated with the other excitation winding (14) are arranged at least in the range or vicinity of the rotor (1) in one second plane, and the rotor (1) is disposed in a plane lying between these two planes.

A still smaller construction height or level can be achieved in the manner that the stator parts (7', 8', 9', 10') at least in the range or vicinity of the rotor (1') are arranged in one first plane and the rotor (1') is arranged in a plane parallel thereto.

The construction of the stator and the rotor can be formed such that at least a portion of the stator poles (e.g., 16) is provided with auxiliary poles (17) formed thereon and the rotor (1) comprises a permanent magnet (2) made of a lanthanide-ferromagnetic alloy.

Still of advantage is an embodiment by which the stator poles (15', 16') are formed circularly annular sector shaped and the rotor (1') is made of a soft magnetic material (or low retentive material) of low coercive force or retentivity and has rectangularly shaped main poles (18), of which each main pole passes or transfers on a radial limit line or boundary line into a triangularly-shaped auxiliary pole (19), and a permanent magnetic circuit (20) is provided by which the rest position of the rotor is determined or set with an unexcited condition of the stator (6').

Such an embodiment form with respect to the first described embodiment has the advantage that it possesses a particularly compact construction and the rotor as well as also the stator parts can be stamped or punched out of sheet metal or sheet.

According to one embodiment of the invention the permanent magnetic circuit (20) comprises 2 n (n=1, 2, 3 ... m) permanent magnets (21, 22), n of which point or face with its north pole and the others point with its south pole toward the rotor (1'). It has shown that in general two permanent magnets suffice for the construction of the magnetic circuit. A still advantageous embodiment with respect to its production costs resides in the permanent magnet circuit (20) comprising at least one permanent magnet (21, 22) and a magnetic flux return plate arranged on a side of the magnet facing away from the rotor (1), the free end of which return plate is offset or displaced with respect to the permanent magnet (21, 22) by at least the angle α of two adjacent rotor poles (18).

It has proven advantageous, in order to achieve a smallest possible construction height or level of the motor to use permanent magnet(s) (21, 22) made of a lanthanide-ferromagnetic alloy. Such type of alloys have a particularly high energy product (BH) max., so that permanent magnets made of this material can be held very small.

According to an advantageous embodiment of the invention the free ends of the stator poles are constructed to receive and mount therein a bearing (4, 5; 25) for the rotor shaft (3; 26). This permits, without particular difficulties, an exact alignment with respect to each other of the two stator parts which are each associated with one excitation coil, which brings about advantages in efficiency and the energy consumption. Beyond that such a measure possesses functional efficiency or technical production advantages.

With the above and other objects and advantages in view, the present invention will become more clearly understood in connection with the following detailed description of preferred embodiments, when considered with the accompanying drawings, of which:

FIG. 1 is a plan view of a single phase stepping motor with a six polar rotor and a four polar stator;

FIG. 2 is a partially sectioned side view of the single phase stepping motor according to FIG. 1;

Figure 3:
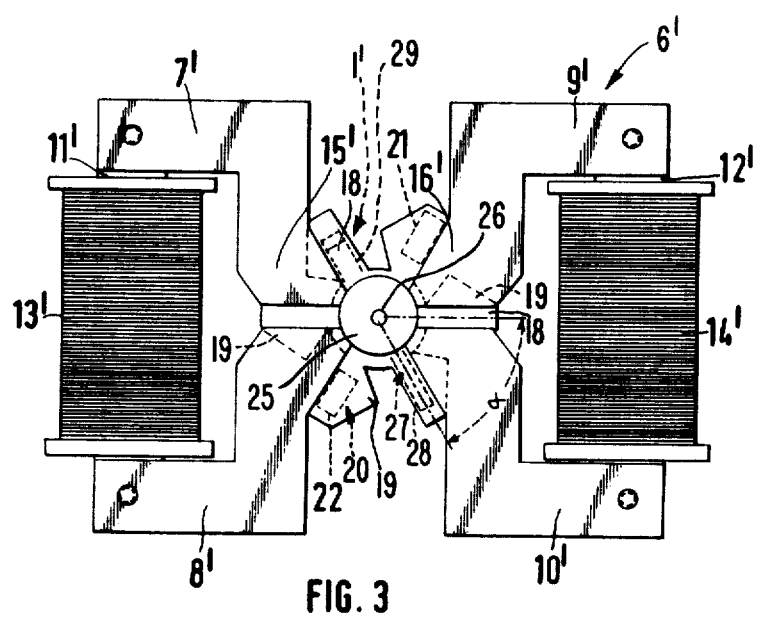
FIG. 3 is a plan view of another single phase stepping motor with a six polar rotor and a four polar stator; each in substantially enlarged illustration.

Referring now to the drawings, a single phase stepping motor in accordance with FIGS. 1 and 2 of the present invention comprises a rotor 1 which is made of a permanent magnet 2 made of a lanthanide-ferromagnetic alloy which is axially magnetized and has six poles, and a shaft 3 on which the permanent magnet 2 is forced or pressed thereon. The shaft 3 is mounted in bushings 4 and 5, which are seated in the stator 6 in passage openings formed by the free ends of the stator parts.

The stator 6 comprises four parts 7, 8, 9 and 10, of which the parts 7 and 8 together with a bridge part 11 form one stator circuit and the parts 9 and 10 with the bridge part 12 forms the second stator circuit. The parts 7 and 8 are arranged in a first plane and the parts 9 and 10 are arranged in a second plane parallel thereto, whereas the motor rotates between the two planes in a plane which is parallel thereto. The pair of stator parts 7 and 8 as well as the pair of stator parts 9 and 10 are held in position relative to each other by screws which connect each of the stator parts of a pair to the associated bridge part, as well as by the bushings 4 and 5, respectively. On each of the two bridge parts 11 and 12 there is located one excitation winding 13 and 14, respectively, which excitation windings are both electrically connected in series with each other. Each stator part transfers or passes on its free end into two circularly annular sector shaped main poles 15 and 16, the main pole 15 being directedly seated on the stator part. On respectively one of the two main poles there is formed or attached on its radial side a triangular auxiliary pole 17, the free point of which points in the circumferential direction into the intermediate space between the main poles 15 and 16, which intermediate space is formed by an arcuate connection piece connecting the main poles 15 and 16. FIG. 1 only shows the main poles 15 and 16 of each of the stator parts 7 and 8 on one side of the rotor 1. The main poles 15 and 16 of each of the stator parts 9 and 10 are on the other side of the rotor 1.

Referring now again to the drawings and more particularly to the embodiment of FIG. 3, the rotor 1' is made of a sheet or sheet metal made of a soft magnetic material of low coercive force or retentivity, for example Hyperm-766, with six main poles 18 and auxiliary poles 19 formed on each of the main poles. The rotor 1' is disposed in one plane and the two stator circuits are disposed in another individual or single plane parallel thereto. Each of the two stator circuits are constructed of two parts 7' and 8' or 9' and 10', respectively, and one connecting bridge part 11' or 12', respectively, with one excitation winding 13' or 14', respectively. The stator parts 7' or 8' are each formed with one circularly annular sector shaped main pole 15' and the stator parts 9' and 10' are each formed with one circularly annular sector shaped main pole 16'. The stator poles teeth 15' and 16' of the respective stator parts 7', 8' and 9', 10' are formed and arranged relative to each other such that all the inwardly directed free ends thereof constitute sectors of a common cylindrical surface, which can engage and retain a cylindrical surface portion of a bearing 25.

The bearing 25, somewhat similar to the bearing 4 or 5 of FIGS. 1 and 2, rotatably mounts the shaft 26 therethrough. The rotor 1' is pressed or forced on the shaft 26. In FIG. 3 the rotor 1' is disposed in a plane behind the stator parts and associated poles. In addition the rotor includes a permanent magnetic circuit 20, which comprises two permanent magnets 21 and 22, the latter being mounted fixed in position. One of the permanent magnets with its north pole lies opposite to the rotor face side and the other with its south pole lies opposite to the face side of the rotor 1'.

In the unexcited condition the rotor 1' is located in a position as illustrated in FIG. 3. In this position the magnetic resistance of the magnetic circuit 20 is the smallest. As soon as the stator 2 is excited, the rotor 1' by means of the auxiliary poles 19 rotates counterclockwise into a position in which the main poles 18 of the rotor 1' come to lie under the stator pole teeth 15' and 16', so that the magnetic resistances of the stator circuits which are effective or operative during the excitation are a minimum. Now the auxiliary poles 19 project into the range of the permanent magnetic circuit 20, so that when the excitation in the stator circuits 18 dies out or decays, the rotor 1' continues to turn counterclockwise into the illustrated position by means of the auxiliary poles 19.

In operation pulses are fed to the excitation coils causing the rotor of the single phase stepping motor to undergo its stepwise movement.

For appreciation of the actual dimensions of such a type of motor which is rated for an operating voltage of less than or equal to 1.5 volts, the following attainable dimensions may be stated: length approximately 8 mm, width approximately 4 mm and height approximately 1.9 mm.

While there has been disclosed two embodiments of the present invention it is to be understood that these embodiments are given by example and not in a limiting sense.

Instead of or in addition to the permanent magnetic circuit 20 there may be provided another magnetic circuit 27 consisting of a permanent magnet 28 and a return plate 29. On the one end of the return plate 29 there is arranged the magnet 28, while the other end of the return plate 29 is bent upwardly against the rotor 1'.

I claim:

1. In a single phase stepping motor, particularly for clocks, with a multi-polar rotor and a multi-part stator, the latter carrying two excitation windings and on its free ends having stator poles defining teeth which are directed toward the face side of the rotor as well as a passage opening for a rotor shaft, the improvement comprising a stator comprising four stator parts, each of said stator parts having the same number of stator poles with the same distribution, two bridge parts, one of said bridge parts connecting two of said stator parts with each other, respectively, at pole-free ends of the latter, two excitation windings, one of said bridge parts carrying one of said excitation windings, respectively, said two excitation windings are connected in series, two of said stator parts associated with one of said two excitation windings at least in a range of the rotor are arranged in a first plane and the other two of said stator parts which are associated with the other of said two excitation windings are arranged at least in a range of the rotor in a second plane spaced from said first plane, the rotor is disposed in a plane between said first and said second planes, at least a part of the stator poles includes auxiliary poles formed thereon, the rotor comprising the rotor shaft and an axially magnetized permanent magnet disc mounted thereon and having at least six rotor poles of alternating polarity spaced equally from each other, each of said stator parts having at least two main poles extending therefrom, one of said at least two main poles being seated directly on said stator part, and a connection piece connecting the other of said at least two main poles with said one of said at least two main poles in such a manner that between respectively said at least two main poles of said stator part there is defined an intermediate space, and each said auxiliary poles being formed on one of said stator parts projecting into said intermediate space.

2. The single phase stepping motor as set forth in claim 1, wherein
said four stator parts at least in the range of the rotor are aligned in a first plane and the rotor is disposed in a plane parallel thereto.

3. The single phase stepping motor as set forth in claim 1, wherein
the rotor comprises a permanent magnet made of a lanthanide-ferromagnetic alloy.

4. In a single phase stepping motor, particularly for clocks, with a multi-polar rotor and a multi-part stator, the latter carrying two excitation windings and on its free ends having stator poles defining teeth which are directed toward the face side of the rotor as well as a passage opening for a rotor shaft, the improvement comprising
a stator comprising four stator parts, each of said stator parts having the same number of stator poles with the same distribution,
two bridge parts, one of said bridge parts connecting two of said stator parts with each other, respectively, at pole-free ends of the latter,
two excitation windings, one of said bridge parts carrying one of said excitation windings, respectively,
said two excitation windings are connected in series,
said four stator parts at least in the range of the rotor are aligned in a first plane and the rotor is disposed in a plane parallel thereto,
the stator poles are circularly annular sector shaped, and the rotor is made of a soft magnetic material of low retentivity and has rectangularly shaped main poles defining radial limit lines, respectively,
a triangularly-shaped auxiliary pole passes from each of said main poles, respectively, at said radial limit lines, respectively, and
permanent magnetic circuit means for determining a rest position of the rotor with an unexcited condition of said stator.

5. The single phase stepping motor as set forth in claim 3, wherein
said permanent magnetic circuit means comprises 2 n ($n=1, 2, 3 \ldots m$) permanent magnets, said permanent magnets each have a south pole and a north pole, respectively, n of said permanent magnets point to the rotor with said north poles thereof, respectively, and the others of said permanent magnets point to said rotor with said south poles thereof, respectively.

6. The single phase stepping motor as set forth in claim 5, wherein
said permanent magnets are made of a lanthanide-ferromagnetic alloy.

7. The single phase stepping motor as set forth in claim 4, wherein
said permanent magnetic circuit means is made of at least one permanent magnet and a return plate, said at least one permanent magnet has a side thereof facing away from said rotor, said return plate is arranged on said side of said at least one permanent magnet facing away from said rotor, said return plate has a free end displaced relative to said at least one permanent magnet by at least an angle $\alpha$ of two adjacent of the rotor poles.

8. The single phase stepping motor as set forth in claim 7, wherein
said at least one permanent magnet is made of a lanthanide-ferromagnetic alloy.

9. The single phase stepping motor as set forth in claim 1, further comprising
bearing means for said rotor shaft,
the stator poles have free ends formed to seat said bearing means.

10. The single phase stepping motor as set forth in claim 9, wherein
said bearing means constitute two bearings, each of said two bearings, respectively, are mounted between said free ends of said stator poles of each of said two of said four stator parts, respectively,
said rotor shaft is rotatably disposed in both of said two bearings with said rotor disposed between said stator poles of each of said two of said four stator parts.

11. The single phase stepping motor as set forth in claim 1 wherein
exclusively only a single of said at least two main poles has said auxiliary pole thereon.

12. The single phase stepping motor as set forth in claim 11 wherein
exclusively only said other of said at least two main poles has said auxiliary pole thereon.

* * * * *